(12) United States Patent
Seifert et al.

(10) Patent No.: US 10,647,418 B2
(45) Date of Patent: May 12, 2020

(54) AIRCRAFT LOAD AND VIBRATION ATTENUATION

(71) Applicant: Bell Helicopter Textron Inc., Fort Worth, TX (US)

(72) Inventors: Michael S. Seifert, Southlake, TX (US); Brett C. Howard, Grapevine, TX (US); Thomas C. Parham, Jr., Colleyville, TX (US); Martin Alex Peryea, Southlake, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 444 days.

(21) Appl. No.: 15/418,652

(22) Filed: Jan. 27, 2017

(65) Prior Publication Data
US 2017/0334552 A1 Nov. 23, 2017

Related U.S. Application Data

(60) Provisional application No. 62/337,374, filed on May 17, 2016.

(51) Int. Cl.
| | |
|---|---|
| *F16F 15/02* | (2006.01) |
| *B64C 27/00* | (2006.01) |
| *B64C 5/02* | (2006.01) |
| *B64C 27/04* | (2006.01) |
| *F16F 7/01* | (2006.01) |
| *B64C 27/82* | (2006.01) |
| *B64C 29/00* | (2006.01) |

(52) U.S. Cl.
CPC .............. *B64C 27/001* (2013.01); *B64C 5/02* (2013.01); *B64C 27/04* (2013.01); *F16F 7/01* (2013.01); *B64C 29/0033* (2013.01); *B64C 2027/8281* (2013.01); *F16F 7/015* (2013.01); *F16F 2224/0275* (2013.01)

(58) Field of Classification Search
USPC ......................................... 188/268, 378, 379
See application file for complete search history.

(56) References Cited

U.S. PATENT DOCUMENTS

| | | | | | |
|---|---|---|---|---|---|
| 3,119,469 | A * | 1/1964 | Farr | ........................... | F16F 9/12 188/276 |
| 5,855,260 | A * | 1/1999 | Rubin | ....................... | B64C 1/40 188/378 |
| 6,224,341 | B1 * | 5/2001 | Fricke | ..................... | F01D 5/027 188/268 |
| 6,298,963 | B1 * | 10/2001 | Kim | ......................... | F16F 9/306 188/379 |
| 6,547,049 | B1 * | 4/2003 | Tomlinson | ............... | F01D 25/04 188/379 |
| 6,935,472 | B2 * | 8/2005 | Dussac | ..................... | F16F 7/01 188/380 |
| 10,006,513 | B1 * | 6/2018 | Wang | ....................... | F16F 7/015 |
| 2002/0121414 | A1 * | 9/2002 | Barcock | .................. | F16F 7/015 188/268 |

(Continued)

*Primary Examiner* — Christopher P Schwartz
(74) *Attorney, Agent, or Firm* — Patent Capital Group

(57) ABSTRACT

In one embodiment, an apparatus comprises a particle damper for damping a component when the particle damper is attached to the component. The particle damper comprises a plurality of pockets configured to hold a plurality of particles, and the particle damper also comprises an attachment fitting for coupling the particle damper to the component.

18 Claims, 8 Drawing Sheets

(56) References Cited

U.S. PATENT DOCUMENTS

2006/0180420 A1* 8/2006 Rongong .................. F16F 7/01
                                                    188/378
2012/0024646 A1* 2/2012 Tsugihashi .............. F16F 7/015
                                                    188/268

* cited by examiner

AIRCRAFT LOAD AND VIBRATION ATTENUATION

CROSS-REFERENCE TO RELATED APPLICATIONS

This patent application claims the benefit of the filing date of U.S. Provisional Patent Application Ser. No. 62/337,374, filed on May 17, 2016, and entitled "Method and Apparatus for Vibration Attenuation," the content of which is hereby expressly incorporated by reference.

TECHNICAL FIELD

This disclosure relates generally to aircraft performance, and more particularly, though not exclusively, to attenuation of aircraft loads and vibrations.

BACKGROUND

Aircraft are subjected to various aerodynamic and operational forces during operation. For example, the aerodynamic forces involved during operation of a rotorcraft may include thrust, drag, lift, and weight. In certain circumstances, aerodynamic and operational forces may increase the structural load on components of an aircraft and may also cause vibration. Excessive loads and vibration during operation of an aircraft (e.g., tail loads and vibration) are undesirable and potentially harmful to the aircraft, as they can negatively impact the structural integrity, mechanical integrity, and performance of the aircraft. For example, loads and vibration can cause components of an aircraft to bend and may reduce the structural integrity and fatigue life of the aircraft. Moreover, vibration is undesirable to passengers of an aircraft, as vibration may cause the aircraft to shake and/or produce loud noise, which may negatively impact the comfort of the passengers.

SUMMARY

According to one aspect of the present disclosure, an apparatus comprises a particle damper for damping a component when the particle damper is attached to the component. The particle damper comprises a plurality of pockets configured to hold a plurality of particles, and the particle damper also comprises an attachment fitting for coupling the particle damper to the component.

DETAILED DESCRIPTION

Figure 1A:
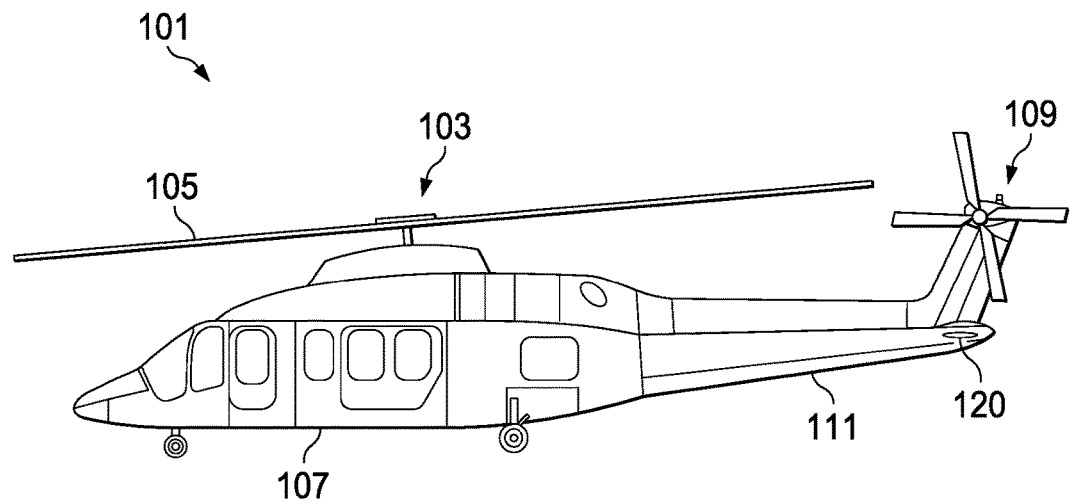
FIGS. 1A-B and 2 illustrate example aircraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In this specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1B:
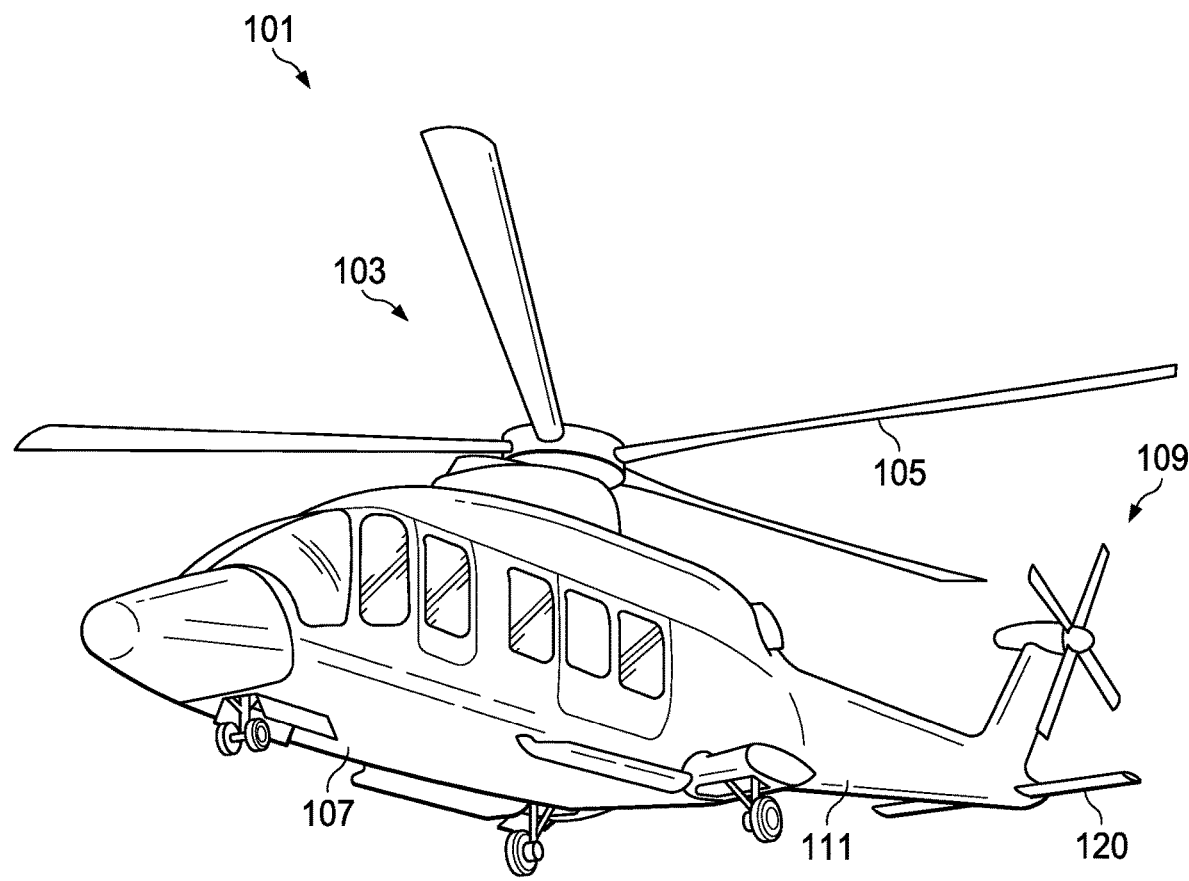
Figure 2:
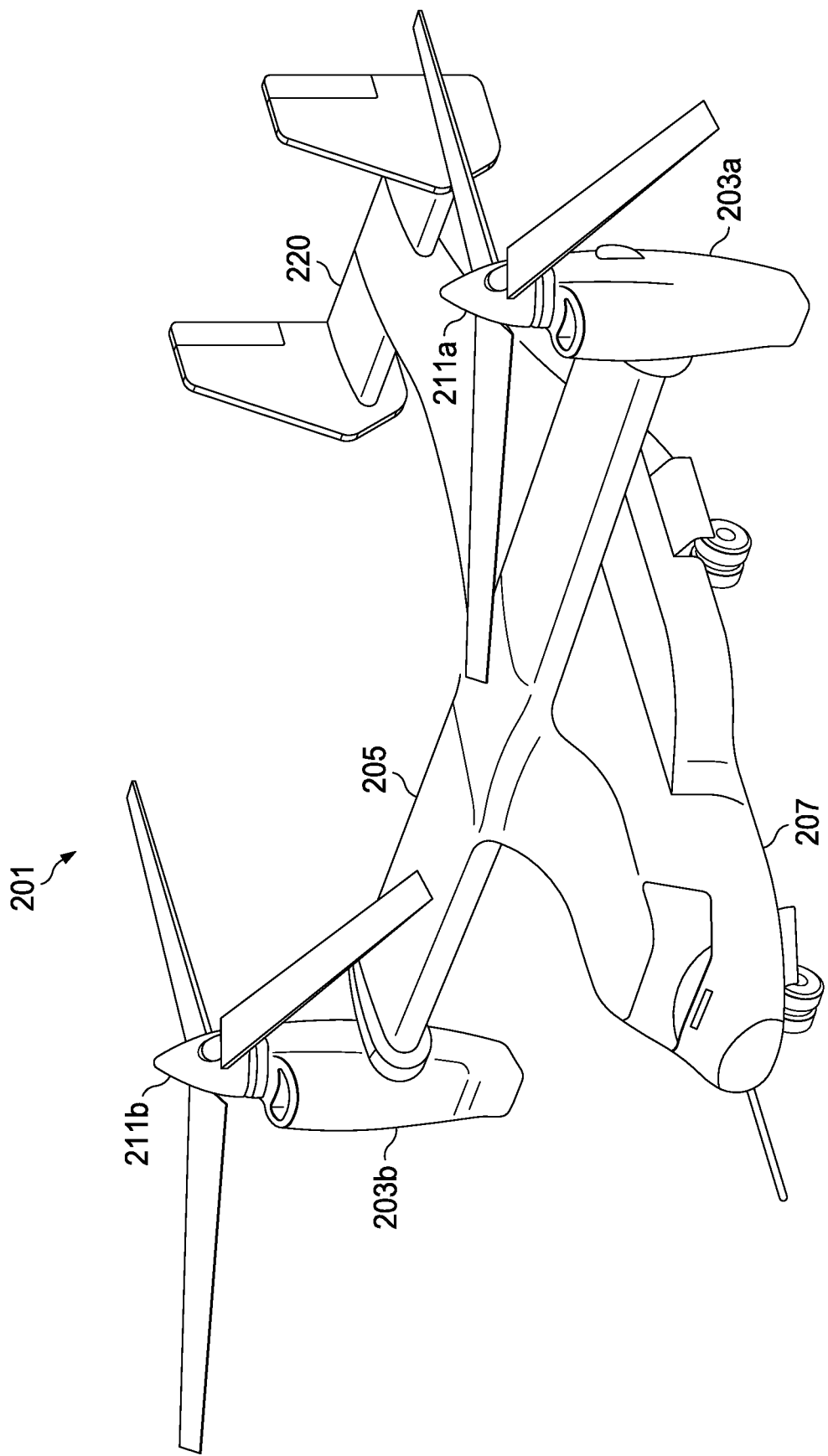

FIGS. 1 and 2 illustrate various example aircraft in accordance with certain embodiments, as discussed further below.

FIGS. 1A and 1B illustrate an example embodiment of a rotorcraft 101. FIG. 1A illustrates a side view of rotorcraft 101, while FIG. 1B illustrates a perspective view of rotorcraft 101. Rotorcraft 101 has a rotor system 103 with a plurality of rotor blades 105. The pitch of each rotor blade 105 can be managed or adjusted in order to selectively control direction, thrust, and lift of rotorcraft 101. Rotorcraft 101 further includes a fuselage 107, anti-torque system 109, an empennage 111, and a tail structure 120. In this example, tail structure 120 can represent a horizontal stabilizer. Torque is supplied to rotor system 103 and anti-torque system 109 using at least one engine.

FIG. 2 illustrates a perspective view of an example tiltrotor aircraft 201. Tiltrotor aircraft 201 can include nacelles 203a and 203b, a wing 205, a fuselage 207, and a tail structure 220. In this example, tail structure 220 can represent a vertical stabilizer. Each nacelle 203a and 203b can include an engine and gearbox for driving rotor systems 211a and 211b, respectively. Nacelles 203a and 203b are each configured to rotate between a helicopter mode, in which the nacelles 203a and 203b are approximately vertical, and an airplane mode, in which the nacelles 203a and 203b are approximately horizontal.

It should be appreciated that rotorcraft 101 of FIG. 1 and tiltrotor aircraft 201 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, and a variety of helicopter configurations, among other examples. Moreover, it should be appreciated that even though aircraft are particularly well suited to implement embodiments of the present disclosure, the described embodiments can also be implemented using non-aircraft vehicles and devices.

A rotorcraft (e.g., rotorcraft 101 or rotorcraft 201) is subjected to various aerodynamic or operational forces during operation, including thrust, drag, lift, and weight. In certain circumstances, the aerodynamic forces may increase the structural load on components of the rotorcraft and may also cause vibration. In general, vibration may be caused by the rotor(s), engine(s), and/or transmission of the rotorcraft. For example, when the rotor of a rotorcraft is in motion, the structural components of the rotorcraft (e.g., the rotor blades and the tail) are continuously subjected to an oscillating force that may increase the structural load on the rotorcraft components and may lead to vibration. In general, vibration may be low when a rotorcraft is in hover, but may increase during forward flight or transition. For example, during forward flight, vibration may increase with the speed of the rotorcraft, and thus high levels of vibration may result when the rotorcraft is flying at its maximum speed. Moreover, when a rotorcraft is in transition, vibration may increase due to the rotor wake influence on the blade air loads. For example, vibration may increase during descent at low speeds or during thrust at high speeds. In some cases, for example, the tail structure of a rotorcraft may vibrate when the rotorcraft is in flight. For example, in certain flight scenarios, the vortex wake from a rotor may impinge directly on the tail of a rotorcraft and may cause the tail to vibrate vertically.

Excessive loads and vibration during operation of a rotorcraft (e.g., tail loads and vibration) are undesirable and potentially harmful to the rotorcraft, as they can negatively impact the structural integrity, mechanical integrity, and performance of the rotorcraft. For example, oscillatory loads and vibration can cause the components of a rotorcraft to bend and may reduce the structural integrity and fatigue life of the rotorcraft. Moreover, vibration is undesirable to passengers of a rotorcraft, as vibration may cause the rotorcraft to shake and/or produce loud noise, which may negatively impact the comfort of the passengers. Accordingly, there is a need to control or reduce the loads and vibration of components of rotorcraft and other aircraft during operation.

In some cases, the loads or vibration of rotorcraft components (e.g., loads and vibration of the tail structure) may be addressed by dynamic tuning of modes, for example, by stiffening structural components or adjusting mass distribution. Stiffening a structural component of a rotorcraft, for example, may be achieved by adding additional composite plies to strengthen the component. Adjusting the mass distribution of a rotorcraft may be achieved by redesigning structural components based on the desired mass distribution, for example, to redistribute the total mass and/or increase the mass of certain components. Alternatively, the mass distribution of a rotorcraft could be adjusted using dedicated tuning masses to increase the mass of certain components. For example, dedicated tuning masses (e.g., depleted uranium) could be added to the tail of a rotorcraft to attenuate oscillatory loads in the tail of the rotorcraft. These approaches, however, can be inefficient and may have various drawbacks. For example, once a rotorcraft has been designed and the manufacturing tooling has been built, redesigning the rotorcraft to stiffen components and/or redistribute mass (e.g., redesigning the tail structure) may require intrusive design and tooling modifications, which may be cost prohibitive and time consuming. Redesigning certain components of the rotorcraft may also trigger a cascading chain of design and tuning modifications to other components of the rotorcraft. Moreover, these approaches can also be ineffective solutions for attenuating the loads and vibration during operation of a rotorcraft. For example, while stiffening a component may increase its strength, stiffening also results in additional weight and may increase the load on the component. Similarly, while increasing the mass of a component may reduce vibration, the increased mass results in additional weight and may increase the load on the component.

Accordingly, there is a need for an efficient and effective approach of attenuating loads and vibration that occur during operation of rotorcraft and other aircraft. This disclosure describes various embodiments for attenuating aircraft loads and vibration using a particle impact damper (which may also be referred to as a rattle damper). Damping in general is a technique for attenuating the vibrations excited in a particular structure or object. Particle damping may involve the use of freely moving particles in a cavity or enclosure to produce a damping effect. A particle damper, for example, may encapsulate one or more loose particles (e.g., ball bearings) that suppress oscillatory motion by momentum transfer and energy dissipation.

This disclosure describes various embodiments of using particle dampers to attenuate the loads and vibration that occur during operation of rotorcraft and other aircraft. The embodiments described throughout this disclosure can be used on any aircraft with lightly damped structures, such as aircraft with stabilizers (e.g., horizontal and/or vertical stabilizers), vertical fins, control surfaces, and/or tail skids, among other examples. For example, a particle damper can be incorporated into these lightly damped structures in order to control the oscillatory loads inherent in lightly damped structures excited by the turbulent wake of a rotorcraft. In this manner, a particle damper can be used to reduce the magnitude of the oscillatory load at the bending moment of a particular structure. In some embodiments, for example, a particle damper can be integrated or mounted at the tip or edge of an aircraft structure or internally within the structure (e.g., internally within a spar). For example, in some embodiments, a particle damper can be integrated internally or externally on a rotorcraft stabilizer (e.g., a horizontal stabilizer or tail), fin, or control surface, in order to attenuate internal structural loads, loads at structural interfaces, and vibration. For example, particle dampers can be incorporated in the tail of a rotorcraft (e.g., a particle damper at each end of the tail spar) to control the oscillatory loads and vibration in the tail without meaningfully increasing the weight of the rotorcraft, thus enabling the design of lighter tail structures. Furthermore, because a particle damper can be implemented internally within a structure and/or at the tip or edge of the structure, a particle damper can be used to attenuate loads and vibration for an aircraft without disturbing the aerodynamics and airflow of the aircraft. Moreover, in some embodiments, a particle damper can include features that enable tuning (e.g., multiple pockets, adjustable walls, different particle sizes, and so forth) in order to optimize load and vibration attenuation for minimal weight.

The embodiments described throughout this disclosure provide numerous technical advantages, including using particle dampers to control, reduce, and/or attenuate loads and vibration during operation of a rotorcraft (e.g., tail loads and vibration), which may improve its safety, reliability (e.g., reliability of avionics and mechanical equipment), and fatigue life (e.g., the lifespan of airframe structural components), and may also improve passenger comfort. The described embodiments are also lightweight, flexible (e.g., they can be tuned and adjusted for different aircraft), and can be implemented without disturbing the aerodynamics and airflow of the aircraft. Moreover, the described embodiments can be implemented on an aircraft even after it has been designed and the manufacturing tooling has been built, thus avoiding intrusive design and tooling modifications that are cost prohibitive and time consuming.

Example embodiments for attenuating loads and vibration of rotorcraft and other aircraft are described below with more particular reference to the remaining FIGURES.

FIGS. 3A-E illustrate an example embodiment of a rotorcraft tail structure 300 with a particle damper 330. Tail structure 300 or a variation thereof, for example, could be used as the tail of a rotorcraft (e.g., the tail of rotorcraft 101 or rotorcraft 201 from FIGS. 1 and 2). In some embodiments, for example, tail structure 300 could be used as a horizontal stabilizer for a rotorcraft. Tail structure 300 may include an elevator for control and stability of a rotorcraft. Moreover, in some embodiments, particle dampers 330 may be incorporated in tail structure 300 to attenuate loads and vibration in tail structure 300 during operation of the rotorcraft, as described further below.

Figure 3A:
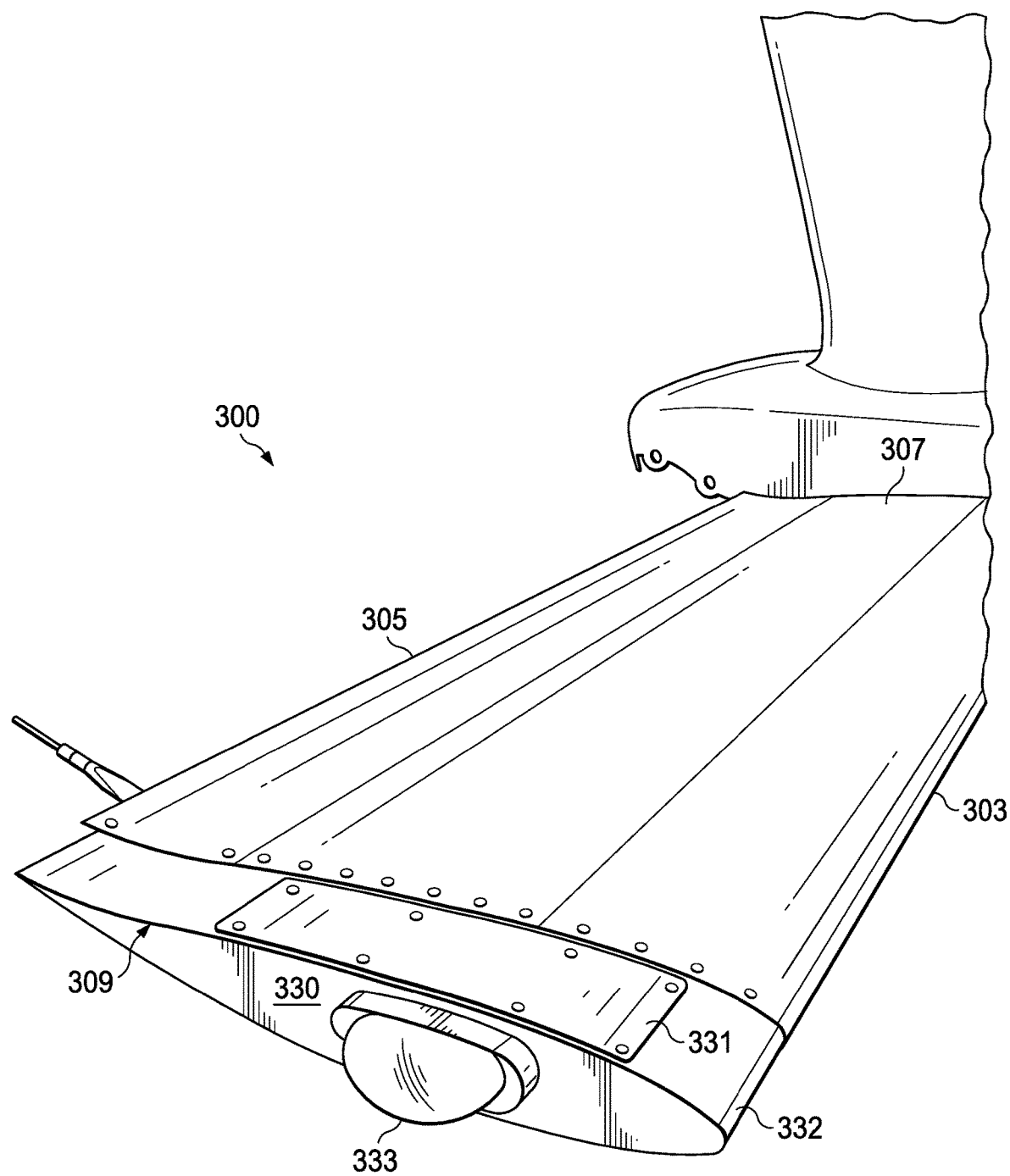
FIGS. 3A-E illustrate an example embodiment of a rotorcraft tail structure with a particle damper.

FIG. 3A illustrates the right-side portion of a rotorcraft tail structure 300. In various embodiments, however, tail structure 300 may be symmetrical, and thus the left-side portion of tail structure 300 may be similar to the right-side portion illustrated in FIG. 3A.

In the illustrated embodiment, tail structure 300 includes leading edge 303, trailing edge 305, inboard end 307, and outboard end 309. Leading edge 303 may be an edge of tail structure 300 that faces towards the front of a rotorcraft, while trialing edge 305 may be an edge of tail structure 300 that faces towards the back of the rotorcraft. Inboard end 307 may be a portion of tail structure 300 near the inner or middle portion of the tail structure 300, while outboard end 309 may be a portion of tail structure 300 near the outer edge of tail structure 300. Tail structure 300 further includes a tip cap 332 and light 333. Tip cap 332 may be a sacrificial and/or removable tip cap used for protecting the outboard end 309 of tail structure 300. Light 333 may be a light source used for visibility and/or navigation purposes.

In the illustrated embodiment, tail structure 300 also includes a particle damper 330 at the outboard end 309 of the tail spar. Moreover, while FIGS. 3A-E only illustrate the right-side portion of tail structure 300, a particle damper 330 may be similarly included at the outboard end of the tail spar on the left-side portion of tail structure 300. Particle damper (s) 330 may be used to attenuate loads and vibration in tail structure 300 during operation of a rotorcraft. For example, during operation, a rotorcraft is subjected to various aerodynamic and operational forces that may increase the structural load and/or cause vibration in certain components of the rotorcraft, such as the tail structure 300. When a rotorcraft is in flight, for example, its tail structure 300 may be continuously subjected to an oscillating force and other operational forces, such as forces created by the rotor(s), engine(s), and/or transmission of the rotorcraft. For example, in certain flight scenarios, the vortex wake from a rotor may impinge directly on the tail structure 300 of a rotorcraft. These various forces may increase the structural load and/or cause vibration in tail structure 300. For example, in some cases, vibration in tail structure 300 may be low when a rotorcraft is in hover, but may increase during forward flight or transition. Excessive loads and vibration in tail structure 300 are undesirable and potentially harmful to the rotorcraft, as they can negatively impact the structural integrity, mechanical integrity, and performance of the rotorcraft. For example, oscillatory loads and vibration can cause tail structure 300 and/or other components of a rotorcraft to bend and may reduce the structural integrity and fatigue life of the rotorcraft. Moreover, vibration is undesirable to passengers of a rotorcraft, as vibration may cause the rotorcraft to shake and/or produce loud noise, which may negatively impact the comfort of the passengers. Accordingly, in some embodiments, particle damper 330 may be incorporated in tail structure 300 to attenuate the loads and vibration in tail structure 300 during operation of a rotorcraft. Particle damper 330 may involve the use of freely moving particles in a cavity or enclosure to produce a damping effect. For example, particle damper 330 may encapsulate one or more loose particles (e.g., ball bearings) that suppress oscillatory motion by momentum transfer and energy dissipation. Moreover, in the illustrated embodiment, particle damper 330 includes a removable cover 331 that can be removed in order to add or remove particles to or from particle damper 330, for example, for tuning and adjustment purposes.

Figure 3B:
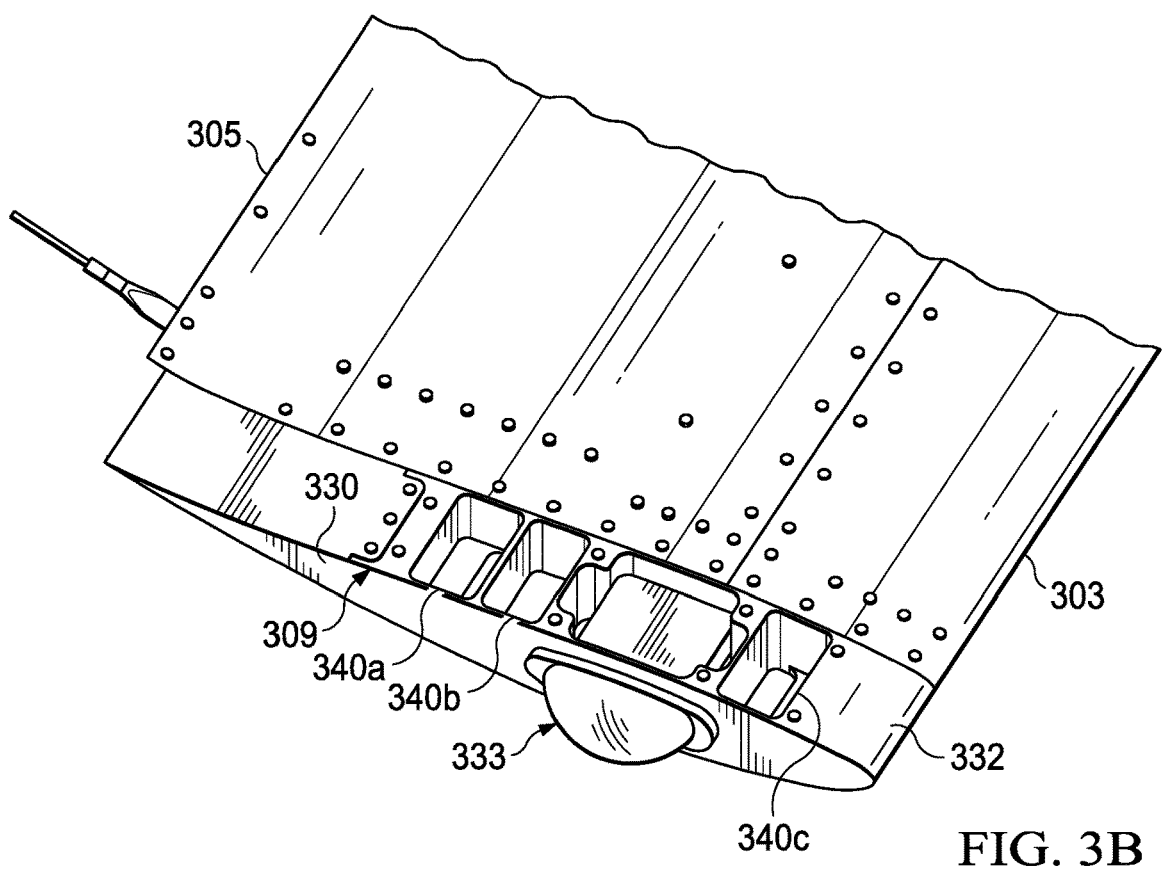
Figure 3C:
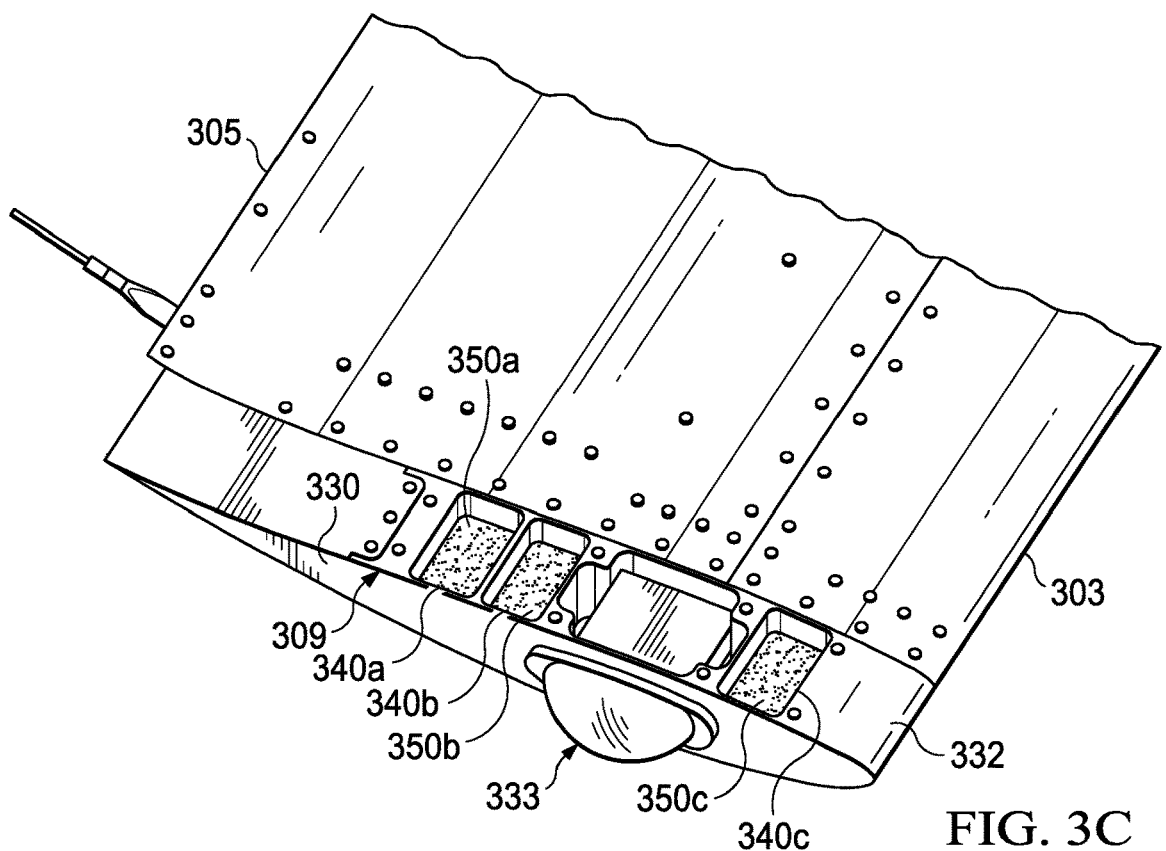

FIGS. 3B and 3C illustrate a portion of tail structure 300 of FIG. 3A, but with the cover 331 of particle damper 330 removed. In the illustrated examples, particle damper 330 includes a plurality of pockets 340a-c. FIG. 3B illustrates the pockets 340a-c when they are empty, while FIG. 3C illustrates the pockets 340a-c after they have been filled with a plurality of particles 350a-c. In some embodiments, for example, a pocket 340 may be a chamber or cavity that is located on an outboard end 309 of tail structure 300. For example, in some embodiments, one or more pockets 340 could be located in tip cap 332 of tail structure 300. Moreover, a pocket 340 can contain a plurality of particles 350. In some embodiments, particles 350 may be generally spherical in shape and can be manufactured out of a ceramic or a metal such as steel or tungsten. For example, in some embodiments, particles 350 may be or may include a plurality of ball bearings.

As explained above, during operation of a rotorcraft, various aerodynamic and operational forces may increase the structural load and/or cause vibration in tail structure 300. When particles 350 in pockets 340 are excited by vibrations during operation of the rotorcraft, the movement of particles 350 within pockets 340 causes damping of the vibration in tail structure 300. For example, the impact of particles 350 on each other and on the walls of pockets 340 (e.g., the top cover 331, sides, and bottom of pockets 340), the friction between each particle 350, and the friction between particles 350 and the walls of pockets 340 cause energy dissipation, which reduces the amplitude of the vibration of tail structure 300.

Moreover, in some embodiments, a particle damper 330 may be designed as a standalone component that can be fastened onto a particular structure or component. In some embodiments, for example, a standalone particle damper 330 may be attached to a particular structure or component using one or more attachment mechanisms or fittings, such as mechanical fasteners and fittings (e.g., threaded holes, plugs, anchors, threaded fasteners, screws, bolts, nuts, washers) and/or any other suitable attachment mechanisms. For example, in some embodiments, a particle damper 330 could be designed as a standalone component that can be fastened to an outboard end 309 of a tail structure 300 of a rotorcraft. Thus, in some embodiments, a particle damper 330 may extend the length of a tail spar (e.g., by 4 inches in some embodiments), which in turn may generate more lift during operation of a rotorcraft. In some embodiments, a particle damper 330 could also be embedded in a tip cap 332 that can be attached to an outboard end 309 of a tail structure 300. Moreover, in some embodiments, a particle damper 330 may span the full width or chord of a tail spar, while in other embodiments a particle damper 330 may span less than the full width or chord of the tail spar (e.g., the particle damper 330 may be truncated such that it only spans a percentage (e.g., 70%) of the full width or chord of the tail spar). In addition, in some embodiments, a particle damper 330 could be designed with removable pocket plugs 340 to facilitate tuning and adjustment. Moreover, particle dampers 330 can be designed using varying numbers of pockets 340, and the pockets 340 can be designed using varying sizes, dimensions, shapes (e.g., circular or square), and/or locations. In addition, the pockets 340 can each be filled with particles 350 of varying sizes and shapes. In some cases, for example, a pocket 340 could be filled with size # F steel shot ball bearings (e.g., ball bearings with a diameter of approximately 0.22 inches or 5.6 millimeters), while in other cases, a pocket 340 could be filled with size #2 steel shot ball bearings (e.g., ball bearings with a diameter of approximately 0.150 inches or 3.8 millimeters).

These various embodiments allow a particle damper 330 to be designed for a particular aircraft and/or aircraft component (e.g., a rotorcraft tail structure 300) after the aircraft and/or aircraft component have already been designed and manufactured, thus enabling the design of the particle damper 330 to be tailored for its particular use. Similarly, these various embodiments also facilitate tuning and adjustment of a particle damper 330 for the particular aircraft or component that the particle damper 330 is used with. A particle damper 330 with multiple pockets 340, for example, may facilitate tuning and adjustment by allowing the particles 350 to be spread across the various pockets 340 of the particle damper 330. For example, if more velocity from the particles 350 is needed in order to counteract the loads and vibration in the tail structure 300 of a rotorcraft during flight, the particles 350 may be spread across the pockets 340 of the particle damper 330 to provide more room for movement within each pocket 340, which may increase the velocity and impact of the particles 350. Moreover, each pocket 340 of a particle damper 330 can be filled with varying number of particles 350, and the particles 350 in each pocket 340 can be varying sizes and/or shapes.

In this manner, the performance or effectiveness of a particle damper 330 can be ascertained based on testing and simulation (e.g., computer-based simulations, hangar testing, and flight testing), and the design and/or configuration of the particle damper 330 can be subsequently adjusted or tuned, as appropriate. For example, in some embodiments, a particle damper 330 can be adjusted or tuned by removing its cover 331 and adjusting the number, size, and/or shape of particles 350 within each pocket 340 of the particle damper 330. A particle damper 330 with removable pocket plugs 340 can be adjusted in a similar manner by removing the pocket plugs 340, adjusting the particles 350 within each pocket plug 340, and inserting the pocket plugs 340 back into the particle damper 330.

In other embodiments, a particle damper 330 may be permanently embedded into the design of a particular structure or component. For example, in some embodiments, the tail structure 300 of a rotorcraft could be designed with particle dampers 330 embedded at each outboard end 309 of the tail structure 300. In these embodiments, a particle damper 330 may still be designed with features that facilitate adjustment and/or tuning, such as removable pocket covers (or removable pockets) for adjusting the particles 350 within each pocket 340, pockets 340 with adjustable sizes and/or walls, and so forth.

Figure 3D:
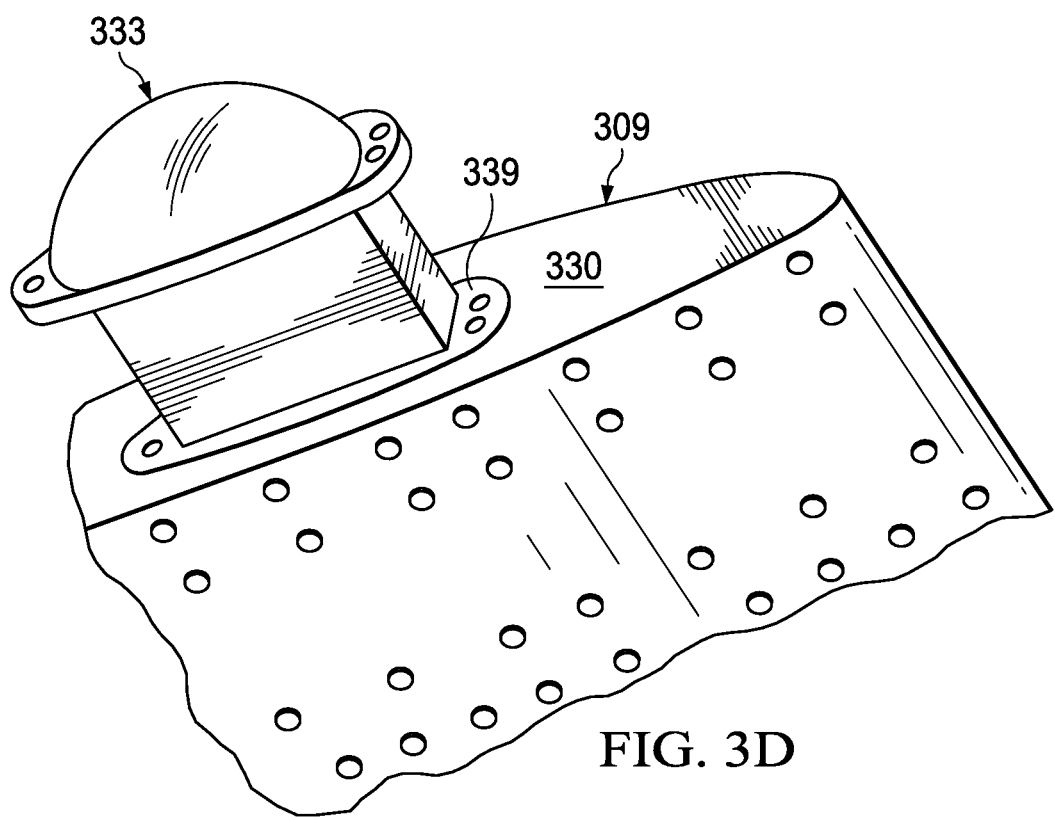
Figure 3E:
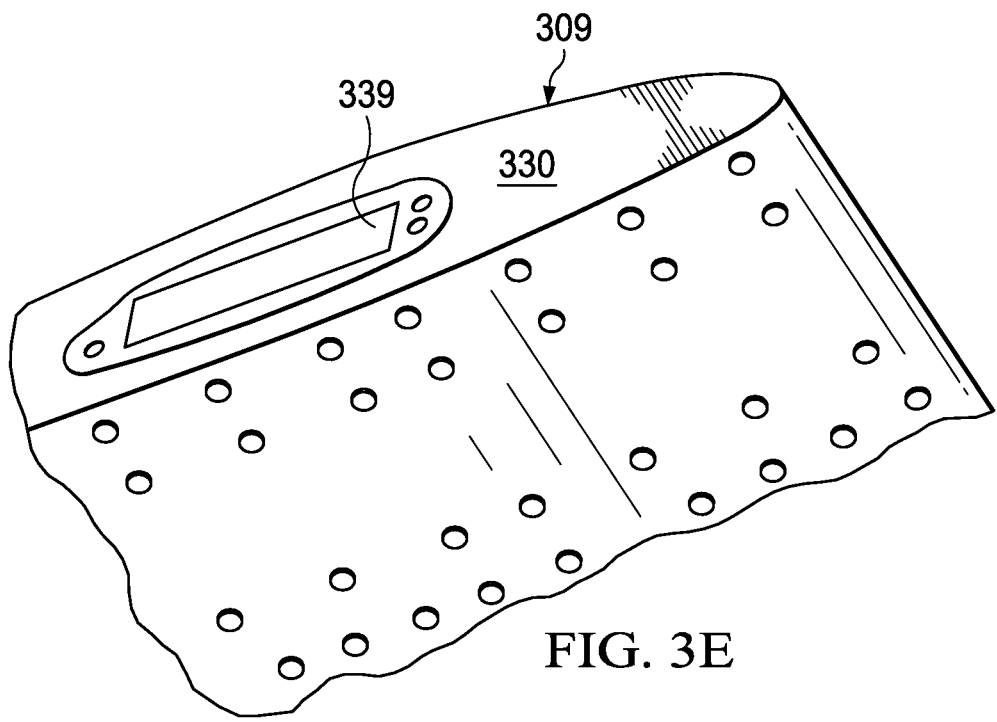

FIGS. 3D and 3E illustrate a portion of tail structure 300 of FIG. 3A without tip cap 332. Moreover, in FIG. 3D, light 333 is included in tail structure 300, while in FIG. 3E, light 333 has been removed from tail structure 300. In some embodiments, for example, a plug (not shown) filled with a plurality of particles 350 can be inserted into the hollow portion of the spar 339 of tail structure 300.

Figure 4:
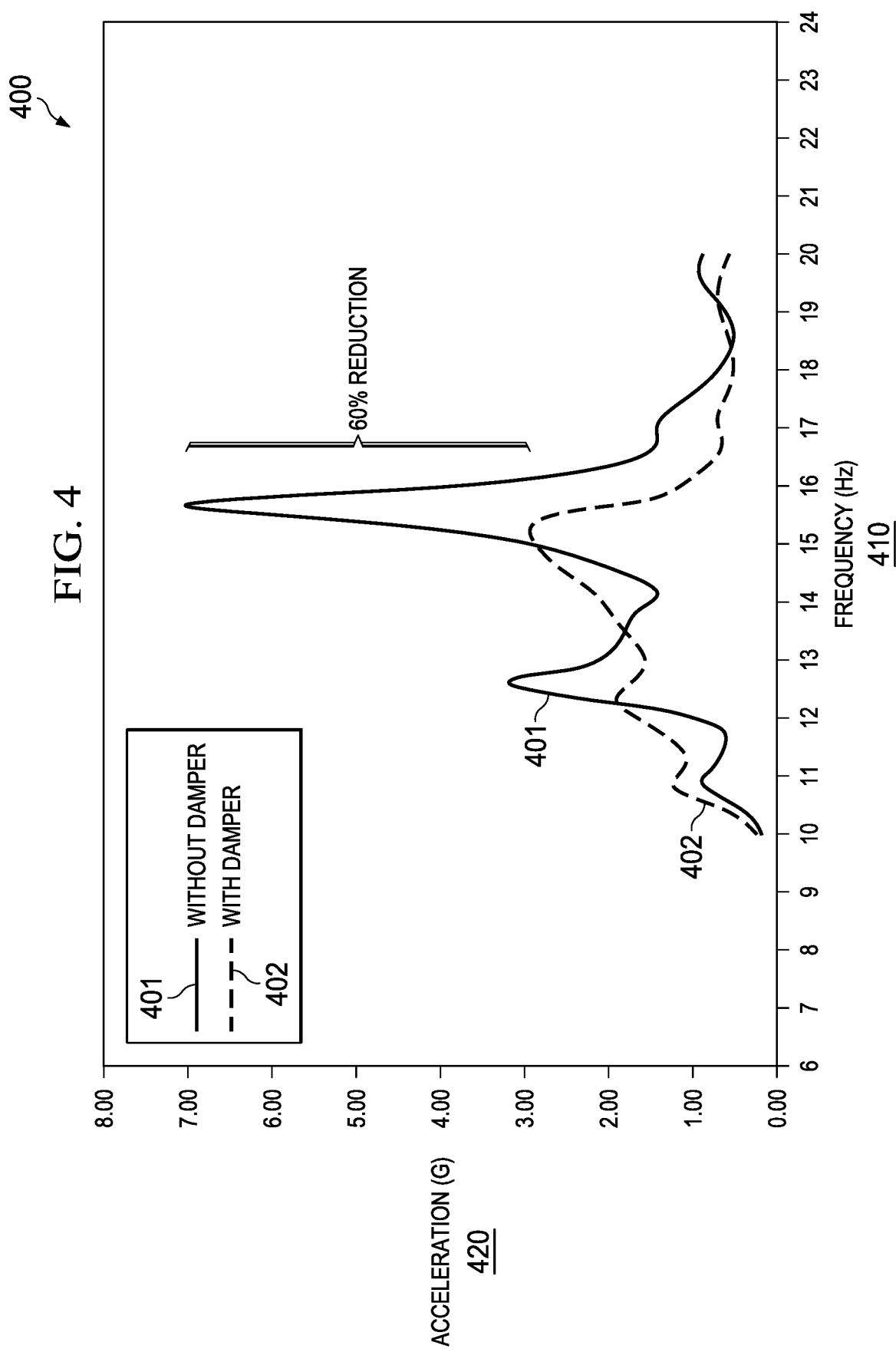
FIGS. 4 and 5 illustrate graphs of the performance of an example rotorcraft with and without a tail damper.
Figure 5:
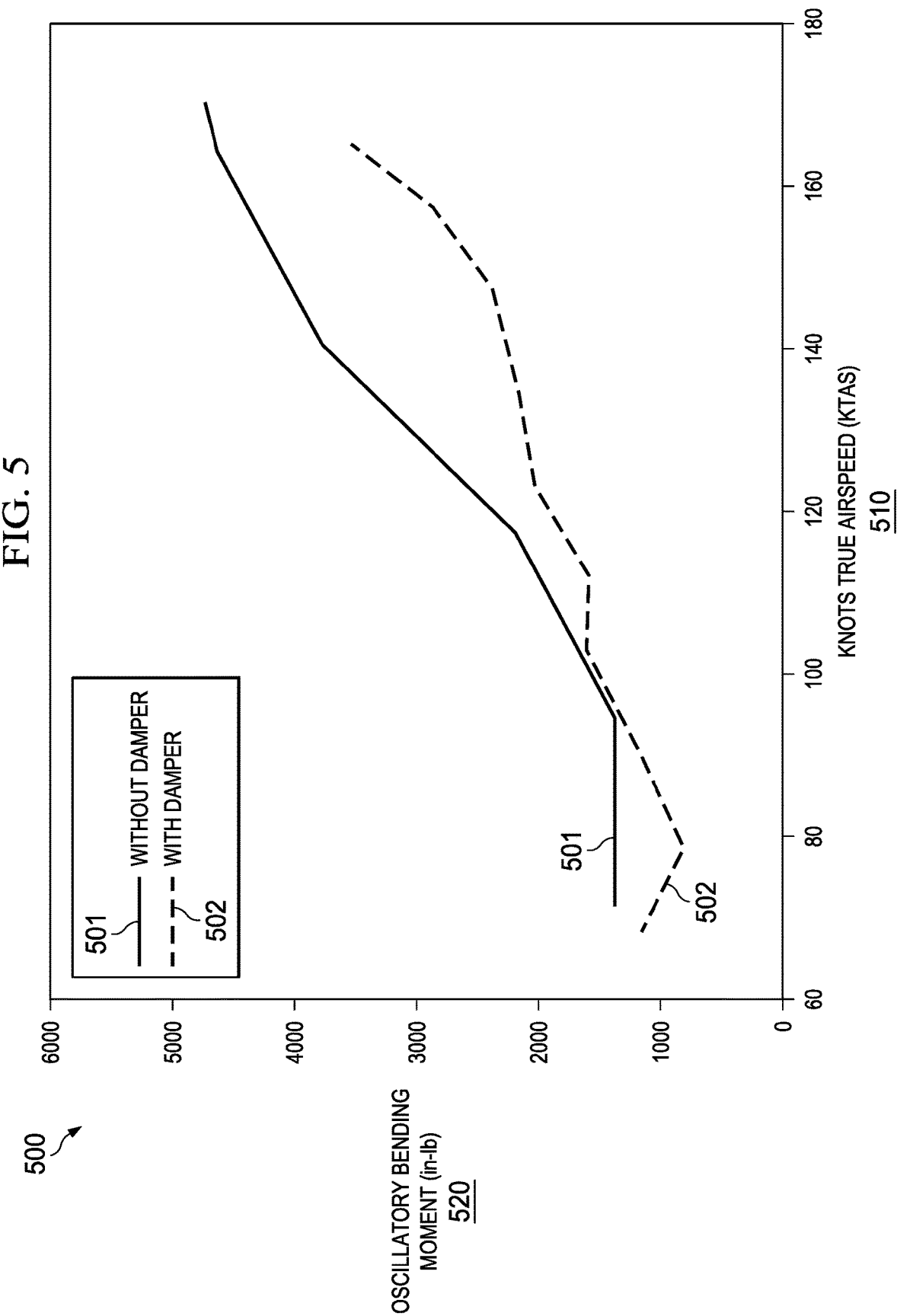

FIGS. 4 and 5 illustrate graphs of the performance of an example rotorcraft with and without a tail damper.

FIG. 4 illustrates a graph 400 plotting the acceleration 420 (e.g., response attenuation) and frequency 410 of the tail of a rotorcraft during a hangar test. A hangar test, for example, may involve shaking a rotorcraft in a test hangar and measuring the acceleration 420 of the tail of the rotorcraft at varying frequencies 410. In graph 400, the acceleration 420 is represented as units of gravity (G) and the frequency 410 is represented as hertz (Hz).

Plot 401 corresponds to an example rotorcraft without a tail damper. As illustrated by plot 401, the acceleration 420 of the tail reaches a peak of approximately 7 G at a frequency of approximately 15.5 Hz. This data indicates that turbulence coming off the front of the rotorcraft causes the tail to respond or vibrate with high acceleration (e.g., approximately 7 G) at the natural frequency of the tail (e.g., approximately 15.5 Hz). This high peak acceleration in the tail can cause harmful structural loads in the rotorcraft airframe. Moreover, stiffening the tail and/or adding mass may be ineffective solutions for reducing the structural loads, as those approaches may simply adjust the natural frequency 410 of the tail without decreasing the amplitude or peak of the acceleration 420 at that frequency. For example, stiffening the tail may increase its natural frequency 410, while adding mass to the tail may decrease its natural frequency 410, but neither approach decreases the amplitude or peak of the acceleration 420 at the natural frequency. Thus, by stiffening or adding mass, a similar peak acceleration 420 would still occur in the tail but at a different frequency 410. Moreover, both approaches increase the weight of the tail and thus also increase inertia, which can compound the problem of structural loads in the airframe of the rotorcraft.

Plot 402 corresponds to an example rotorcraft with a tail damper. Damping is an approach that can be used to reduce the peak acceleration 420 without significantly increasing the weight of the tail of the rotorcraft. As illustrated by plot 402, using a tail damper decreases the peak acceleration 420 of the tail from approximately 7 G to less than 3 G, which is a reduction of approximately 60%. This data indicates that the tail vibration at the natural frequency of the tail (e.g., as caused by turbulence) is counteracted by the moving particles (e.g., ball bearings) in the tail damper. Accordingly, damping the tail vibration in this manner reduces the structural loads in the rotorcraft airframe.

FIG. 5 illustrates a graph 500 of the load attenuation in the tail versus the airspeed of a rotorcraft during a test flight. Graph 500 plots the oscillatory bending moment 520 (e.g., load attenuation) of the tail of the rotorcraft at varying speeds 510. In graph 500, the speed 510 of the rotorcraft is represented using the Knots True Airspeed (KTAS) and the oscillatory bending moment 520 is represented using inches-pounds (in-lbs). A bending moment is a reaction induced in a structural component when an external force is applied to the structural component and causes it to bend. If the force applied to a particular structural component (e.g., a rotorcraft tail structure) exceeds the structural limit of the component (e.g., the external force exceeds the force that can tolerated by the structural component), the structural integrity of the component may be weakened or damaged, thus reducing the fatigue life of the component. In graph 500, the oscillatory bending moment 520 represents the bending moment at the root of the tail of a rotorcraft when the tail is shaking vertically during flight. Accordingly, in order to preserve the structural integrity of the tail of a rotorcraft, it is beneficial to minimize the oscillatory bending moment 520 of the tail during flight.

Plot 501 corresponds to an example rotorcraft without a tail damper, while plot 502 corresponds to an example rotorcraft with a tail damper. As illustrated by plots 501 and 502, the oscillatory bending moment 520 in the tail increases as the speed 510 of the rotorcraft increases, which shows that the vibration and loads in the tail of the rotorcraft increase as the rotorcraft flies faster. However, the oscillatory bending moment 520 in the tail is lower with a tail damper (plot 502) than it is without a tail damper (plot 501). Thus, this data demonstrates that the oscillatory load in the tail is reduced by the tail damper. Moreover, the difference in the oscillatory bending moment 520 with and without a tail damper generally increases as the speed 510 of the rotorcraft increases. Thus, this data demonstrates that a tail damper provides the most significant benefits at higher speeds. For example, the difference in the oscillatory bending moment 520 with and without a tail damper is larger at higher speeds than at lower speeds. Accordingly, a tail damper provides a more significant reduction in loads and vibration at higher speeds (e.g., when the loads and vibration are significant) than at lower speeds (e.g., when the loads and vibration are relatively minimal or steady).

Figure 6:
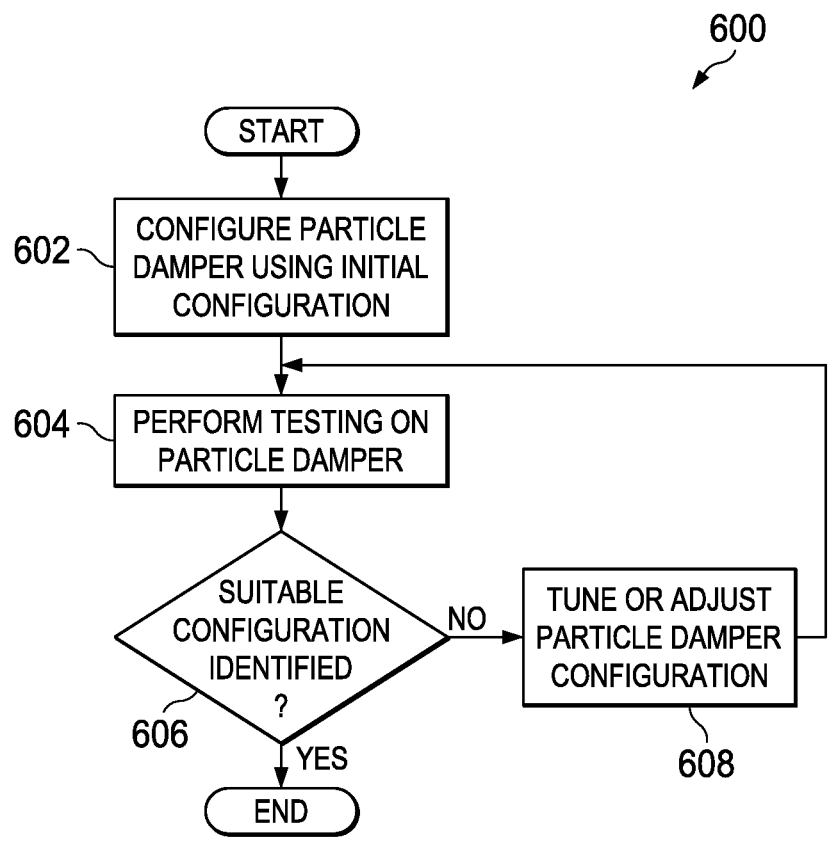
FIG. 6 illustrates a flowchart for an example embodiment of tuning an aircraft particle damper.

FIG. 6 illustrates a flowchart 600 for an example embodiment of tuning an aircraft particle damper (e.g., a particle damper on the tail of a rotorcraft). Flowchart 600 may be implemented, in some embodiments, using the particle damper embodiments described throughout this disclosure (e.g., particle damper 330 of FIGS. 3A-E).

The flowchart may begin at block 602 by configuring a particle damper using an initial configuration. In some embodiments, for example, a particle damper may be designed with features that facilitate tuning and/or adjustment, such as removable pocket covers (or removable pockets) for adjusting the particles within each pocket, pockets with adjustable sizes and/or walls, and so forth. For example, configuring a particle damper may involve adjusting the number, size, and/or shape of particles within each pocket of the particle damper. In some cases, the initial configuration of a particle damper may be identified based on computer-based simulations and testing, prior configurations, and/or a baseline initial configuration.

The flowchart may then proceed to block 604 to perform testing on the particle damper. For example, the performance or effectiveness of the particle damper (e.g., its effectiveness for reducing loads and vibration) can be ascertained from tests and simulations, such as computer-based simulations, hangar testing, and flight testing. In some embodiments, for example, computer-based simulations may be used to identify the initial configuration of the particle damper, while hangar testing and/or flight testing may be used to further tune, adjust, and/or validate the configuration of the particle damper. For example, after identifying an initial configuration (e.g., based on computer-based simulations), hangar testing may then be iteratively performed to continue tuning the configuration of the particle damper. In some cases, once a suitable configuration for the particle damper has been identified from the hangar testing, flight testing may then be used to validate and/or adjust the identified configuration.

The flowchart may then proceed to block 606 to determine whether a suitable configuration for the particle damper has been identified. For example, in some embodiments, the testing performed at block 604 may reveal whether, and to what extent, the particle damper reduces or attenuates the loads and vibration in the aircraft (or in the aircraft tail or other structure). If the testing performed at block 604 reveals that the particle damper reduces or attenuates the loads and vibration by a desired threshold, then at block 606 it is determined that the testing was successful and thus a suitable configuration for the particle damper has been identified. At this point, the flowchart may be complete. However, if the testing performed at block 604 reveals that the particle damper fails to reduce or attenuate the loads and vibration by a desired threshold, then at block 606 it is determined that the testing was unsuccessful and thus no suitable configuration for the particle damper has been identified. The flowchart may then proceed to block 608 to tune or adjust the configuration of the particle damper, as described below.

At block 608, the configuration of the particle damper is tuned or adjusted. For example, in some embodiments, the configuration of the particle damper may be tuned or adjusted based on the testing performed at block 604. For example, if the testing from block 604 reveals that more velocity from the particles is needed in order to counteract the loads and vibration in a rotorcraft tail structure, the particles may be spread across the pockets of the particle damper to provide more room for movement within each pocket, which may increase the velocity and impact of the particles. Alternatively, if the testing reveals that more particles are needed to counteract the loads and vibration in the tail structure, then more particles may be added to one or more pockets of the particle damper.

After the configuration of the particle damper has been tuned and/or adjusted at block 608, the flowchart may then proceed back to block 604 to continue testing, adjusting, and/or tuning the particle damper until a suitable or optimal configuration is identified. In this manner, the performance or effectiveness of a particle damper can be ascertained based on testing and simulation (e.g., computer-based simulations, hangar testing, and flight testing), and the design and/or configuration of the particle damper can be subsequently adjusted or tuned, as appropriate, until a suitable or optimal configuration is identified.

At this point, the flowchart may be complete. In some embodiments, however, the flowchart may restart and/or certain blocks may be repeated. For example, in some embodiments, the flowchart may proceed to step 608 to continue adjusting and tuning the configuration of the particle damper for optimal performance. Alternatively, in other embodiments, the flowchart may restart at step 602 to restart the configuration process for the particle damper in connection with another aircraft or aircraft component that the particle damper may be used with.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An apparatus, comprising:
    a particle damper for damping a component of an aircraft, when the particle damper is attached to the component, wherein the particle damper comprises:
        a plurality of pockets configured to removably retain a plurality of particles; and
        an attachment fitting for removably coupling the particle damper to an outboard end of the component.
2. The apparatus of claim 1, wherein the particle damper is configured for attachment to a stabilizer of the aircraft to provide damping for the stabilizer.
3. The apparatus of claim 2, wherein the stabilizer is a horizontal stabilizer.
4. The apparatus of claim 3, wherein the horizontal stabilizer is positioned at a tail of the aircraft.
5. The apparatus of claim 2, wherein the stabilizer is a vertical stabilizer.
6. The apparatus of claim 1, wherein the particle damper is configured to enable adjustment of the plurality of particles contained in the plurality of pockets of the particle damper.
7. The apparatus of claim 6, wherein the particle damper further comprises a removable cover for adjustment of the plurality of particles contained in the plurality of pockets of the particle damper.
8. The apparatus of claim 1, wherein the plurality of pockets of the particle damper comprises at least three pockets.
9. The apparatus of claim 1, wherein the aircraft is a rotorcraft.
10. The apparatus of claim 1, wherein at least one pocket of the plurality of pockets comprises slideable walls for adjusting a size of the at least one pocket.
11. The apparatus of claim 1, wherein the particle damper is integrated with a tip cap attached to the outboard end of the component.
12. The apparatus of claim 1, wherein the plurality of particles comprises a plurality of ball bearings.
13. A rotorcraft, comprising:
    a particle damper to provide damping for the rotorcraft, wherein the particle damper comprises a plurality of pockets configured to removably retain a plurality of particles and is removably coupled to an external surface of an outboard end of a component of the rotorcraft;
    wherein at least one pocket of the plurality of pockets comprises slideable walls for adjusting a size of the at least one pocket.
14. The rotorcraft of claim 13, wherein the particle damper is configured to provide damping for a stabilizer of the rotorcraft.
15. The rotorcraft of claim 14, wherein the stabilizer is a horizontal stabilizer positioned at a tail of the rotorcraft.
16. The rotorcraft of claim 13, wherein the particle damper is configured to enable adjustment of the plurality of particles contained in the plurality of pockets of the particle damper.
17. A method, comprising:
    identifying a first configuration for a particle damper of a rotorcraft, wherein the particle damper comprises a plurality of pockets configured to removably retain a plurality of particles and an attachment fitting for removably coupling the particle damper to an external surface of an outboard end of the component;
    configuring the particle damper based on the first configuration for the particle damper;
    testing the particle damper to determine a performance level of the first configuration;
    identifying a second configuration for the particle damper based on the performance level of the first configuration; and
    configuring the particle damper based on the second configuration for the particle damper;
    wherein at least one pocket of the plurality of pockets comprises slideable walls for enabling adjustment of a size of the at least one pocket.
18. The method of claim 17, wherein identifying the second configuration for the particle damper based on the performance level of the first configuration comprises determining an adjustment to the plurality of particles used in the first configuration.

* * * * *